United States Patent
Link, II et al.

(10) Patent No.: US 7,209,736 B2
(45) Date of Patent: Apr. 24, 2007

(54) METHOD AND APPARATUS FOR DELIVERING MESSAGES TO WIRELESS DEVICES

(75) Inventors: Charles M. Link, II, Roswell, GA (US); Donald M. Cardina, Lawrenceville, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/834,277

(22) Filed: Apr. 29, 2004

(65) Prior Publication Data
US 2004/0209632 A1    Oct. 21, 2004

Related U.S. Application Data

(62) Division of application No. 09/822,292, filed on Apr. 2, 2001.

(51) Int. Cl.
*H04M 3/00* (2006.01)
*H04Q 7/20* (2006.01)

(52) U.S. Cl. .................. 455/419; 455/420; 455/433; 455/466; 455/456.5

(58) Field of Classification Search .......... 455/418, 455/419, 420, 466, 432.1, 433, 435, 412.2, 455/3.05, 456.5
See application file for complete search history.

(56) References Cited

U.S. PATENT DOCUMENTS

| | | | |
|---|---|---|---|
| 4,831,647 A | 5/1989 | D'Avello et al. | |
| 5,761,618 A | 6/1998 | Lynch et al. | |
| 5,790,952 A * | 8/1998 | Seazholtz et al. | 455/432.1 |
| 5,873,032 A * | 2/1999 | Cox et al. | 455/417 |
| 6,122,503 A | 9/2000 | Daly | |
| 6,148,197 A | 11/2000 | Bridges et al. | |
| 6,173,174 B1 | 1/2001 | Jacobs | |
| 6,195,546 B1 * | 2/2001 | Leung et al. | 455/419 |
| 6,223,045 B1 * | 4/2001 | Valentine et al. | 455/466 |
| 6,272,339 B1 * | 8/2001 | Wiedeman | 455/426.1 |
| 6,564,055 B1 * | 5/2003 | Hronek | 455/433 |
| 6,993,326 B2 * | 1/2006 | Link et al. | 455/414.1 |

OTHER PUBLICATIONS

International Search Report, PCT/US02/09586, (Mar. 29, 2002).

* cited by examiner

*Primary Examiner*—Duc M. Nguyen
(74) *Attorney, Agent, or Firm*—Cantor Colburn LLP (57) ABSTRACT

A method and apparatus for sending messages to a wireless device is disclosed. The invention includes a system and a method that waits for a wireless device to register before sending information to the device. In another aspect, the invention includes provisions that track which wireless devices have successfully received the message and which wireless devices have successfully acknowledged receipt of the message.

21 Claims, 11 Drawing Sheets

METHOD AND APPARATUS FOR DELIVERING MESSAGES TO WIRELESS DEVICES

This is a Divisional application of U.S. application Ser. No. 09/822,292 filed Apr. 2, 2001.

BACKGROUND OF THE INVENTION

1. Field of the Invention

The present invention is directed to the field of wireless communications. More particularly, the present invention is directed to a method and apparatus for updating databases in wireless devices that are designed to operate in wireless communications networks.

2. Discussion of the Related Art

Figure 1:
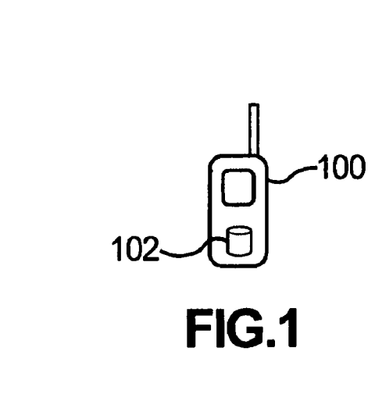
FIG. 1 is a schematic diagram of a wireless device.

Referring to FIG. 1, current wireless devices 100 generally include an internal database 102 that stores information related to local calling areas. A wireless device can be a wireless phone, a computer, a portable computer, a personal data assistant, a pager, a two-way text pager, and other devices. As known in the art, local calling areas are geographic regions where local wireless service providers provide wireless service. Generally, there is more than one wireless service provider in each local calling area.

Figure 2:
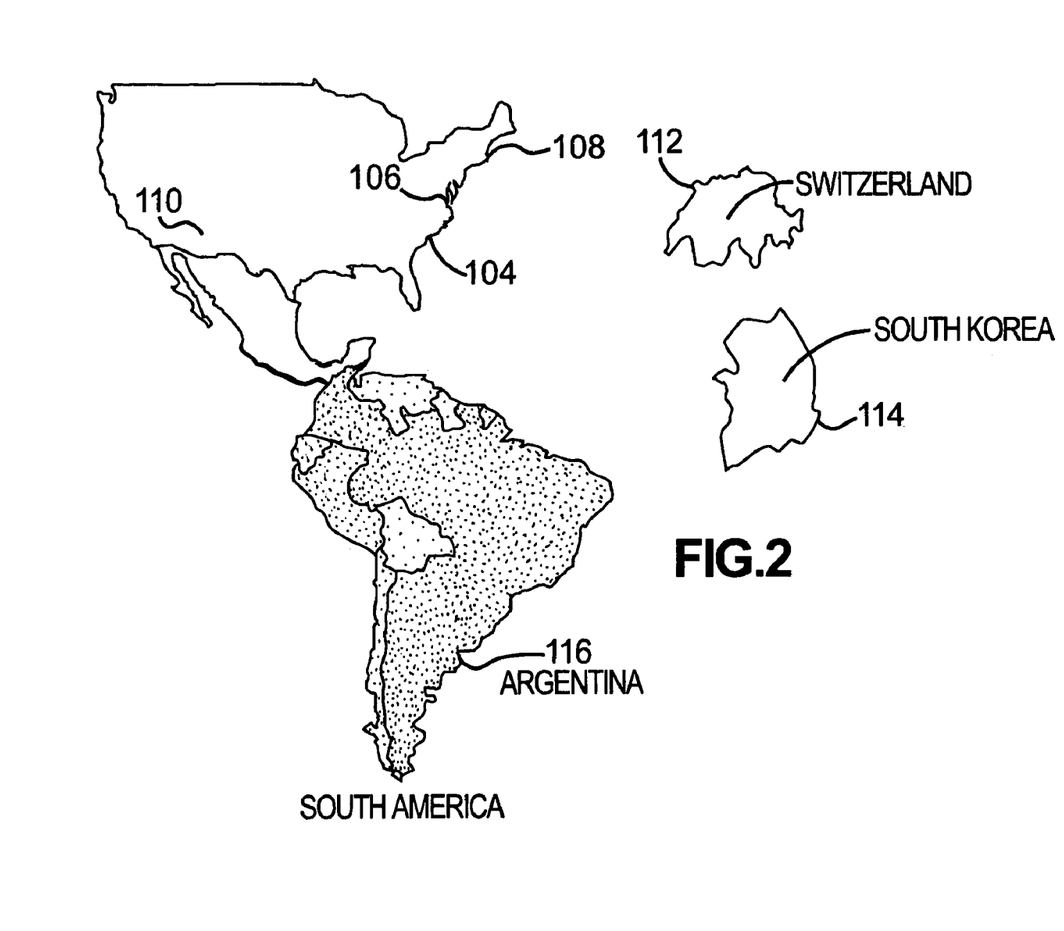
FIG. 2 is a schematic diagram illustrating geographic local calling areas.

As shown in FIG. 2, some examples of local calling areas include a Southeastern region 104 near Atlanta, Ga., a Mid-Atlantic region 106 including Metropolitan Washington, D.C., a Northeastern region 108 that includes New York City, and a Southwestern region 110 that includes Arizona. The four regions mentioned above are examples of only some of the regions in the United States—the United States has many other local calling areas.

In addition to local calling areas in the United States, there are local calling areas in other countries throughout the world. Some examples include: a central European region 112 that includes Switzerland, a Far East region that includes South Korea 114, and a South American region 116 that includes Argentina. Again, there are many other local calling areas throughout the world.

Wireless subscription companies provide wireless telephone service to customers and manage customer accounts. Wireless subscription companies track wireless service usage by customers and bill customers for their use of wireless network resources. Some examples of wireless subscription companies include Cingular, AT&T, Sprint, and Verizon Wireless.

In addition to managing customer accounts, wireless subscription companies also negotiate with local wireless service providers. This is because one wireless subscription company generally does not own the necessary infrastructure and equipment in every local calling area to provide local wireless service on its own network. Therefore, wireless subscription companies generally negotiate with local wireless service providers and eventually enter into agreements with those local wireless service providers. These negotiations generally entail negotiating between the various local wireless providers in a particular region to obtain the most favorable rates for their customers. For example, in a hypothetical situation, a wireless subscription company, for example, Cingular, might negotiate with several local wireless service providers in Northeast region 108. This is a region where Cingular may not provide local wireless service and therefore must negotiate an agreement with a local wireless service provider to provide service for its customers in that region of the country.

In that region, there may be one established local wireless service provider with a large customer base. The network of this established provider may be filled to capacity and therefore, the established provider might offer, for example, 95 cents per minute to Cingular for their customers who use the local Northeast network resources of the established local wireless provider. There may be another service provider that offers, for example, 75 cents per minute, and there may be a new service provider that has excess capacity and needs to populate its network. The new service provider may offer, for example, 15 cents per minute. There are many other factors that affect the prices offered by local wireless service providers. They also change their rates frequently and there are new entrants into the various regional markets that also affect price. So, in response to this dynamic and changing market for local wireless service, wireless subscription providers frequently negotiate new agreements with local wireless service providers and frequently re-negotiate existing agreements.

As wireless device 100 travels through various regions, it is important for wireless device 100 to know which one of the many local wireless service providers has an agreement with the wireless subscription company. Without determining which local wireless service provider has agreed to support the subscription company's customers, wireless device 100 will not be able to utilize wireless service in that region.

Database 102 on wireless device 100 includes information related to the identities of the various local wireless service providers throughout the country and throughout the world that have agreed to provide local wireless service to wireless device 100. Database 102 may include information that informs wireless device 100 which local wireless service provider should be used in the various regions.

As the subscription company negotiates new agreements with different local wireless service providers, the subscription company informs its customers by sending out updated information for each of their customer's wireless devices 100. The updated information is intended to be stored in database 102 and contains information related to local wireless service providers that have entered into agreements with the subscription company. Accordingly, as the subscription company negotiates new agreements and changes the local wireless service providers that will serve their customers, the subscription company must constantly send new information to update databases 102 in all wireless devices 100 subscribing to the company.

In order to update all of the databases 102 of all of their customer's wireless devices, prior art systems simply created a list of all wireless devices associated with their customers and sent updated information to those wireless devices sequentially. In other words, the typical prior art system simply goes down a list of wireless devices and attempts to contact the wireless device and deliver the new updated information for database 102.

This system consumes an enormous amount of system resources and is generally inefficient. This is because prior art systems tended to flood the communications network with the updated information for all of the wireless devices at the same time. Consider a typical situation where a subscription company manages about 15 million wireless devices. The system would have to update the databases in all of these 15 million wireless devices as soon as possible. In order to accomplish this, the prior art system would run down the list of wireless devices that required the updated information, the prior art system would then attempt to transmit that information to the communications network without regard for the amount of traffic that procedure would generate.

In essence, the prior art system would attempt to sequentially deliver 15 million updates. This would put tremendous strain on the communications network and consume enormous amounts of network resources. Also, because prior art systems were sequential, those systems would attempt to deliver messages without regard for the successful delivery of the updated information. In some cases, prior art systems had successful delivery rates below 30%. This meant that the updates would have to be attempted over and over again until the system accomplished a successful delivery. This repetition also consumed an enormous amount of resources on the communications network.

SUMMARY AND OBJECTS OF THE INVENTION

The present invention is directed to a method and apparatus for delivering messages to a wireless device. The present invention generally includes a system and method that receives an autonomous registration from a wireless device, and then, after receiving the autonomous registration, the system transmits information to the wireless device. The transmitted information is associated with the identity of at least one local wireless service provider. That information can be used by the wireless device to update its internal database. By waiting for the autonomous registration from the wireless device, as opposed to transmitting all of the updates sequentially, the present invention conserves resources of the communications network. Also, because the wireless device has registered, there is a greater chance that the wireless device will successfully receive the updated information. The present invention assists in improving the delivery success rate.

In one aspect, the invention includes a step of receiving information about an agreement with a local wireless service provider. Once this information is received, the system waits for a wireless device to register. After the wireless device has registered, the system transmits information to the wireless device related to the agreement with the local wireless service provider. This permits the wireless device to function properly when the wireless device is in the geographic region that is serviced by the local wireless service provider.

In another aspect, the invention includes a method for delivering a message to a wireless device, including the steps of transmitting information to the wireless device in response to an autonomous registration by the wireless device. In this method, the information that is transmitted to the wireless device includes information associated with an identity of at least one local wireless service provider.

In another aspect, the invention includes a system for delivering a message to a wireless device including a centralized database, a pending database adapted to store information related to the records of messages that have been sent but no acknowledgement has been received, a concerned database adapted to store information related to records of wireless devices that have not yet received updated information, and a message database adapted to store portions of SMS messages, wherein the system sends information to a wireless device in response to an autonomous registration by the wireless device.

In another aspect, the invention includes a method for determining successful delivery of a message to a wireless device, including the steps of: receiving a return result from a wireless device, determining if the return result is an error, if the result is an error determining the total number of errors received and comparing the total number of errors to a predetermined number, and associating the wireless device with an unavailable condition in a database if the total number of errors received exceeds the predetermined total.

In another aspect, the invention includes a method for determining successful delivery of a message to a wireless device comprising the steps of: checking a time stamp of a record in a pending database, using the time stamp to determine a total time, determining if the total time exceeds a predetermined time period, and updating the history database if the total time exceeds the predetermined period.

It is to be understood that both the foregoing general description and the following detailed description are exemplary and explanatory and are intended to provide further explanation of the invention as claimed.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENT(S)

Reference will now be made in detail to the preferred embodiments of the present invention, examples of which are illustrated in the accompanying drawings.

Figure 3A:
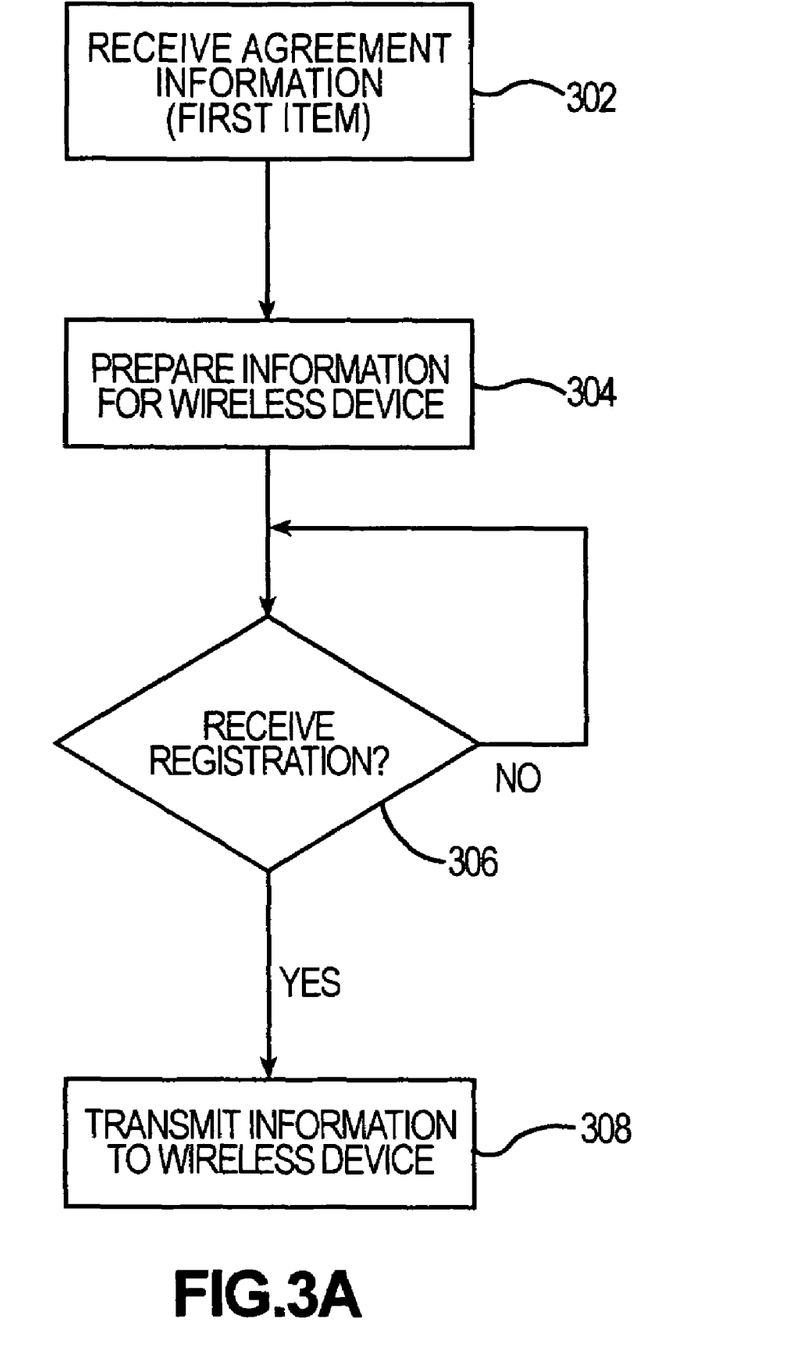
FIG. 3A is an exemplary flow diagram of an embodiment of the present invention.
Figure 3B:
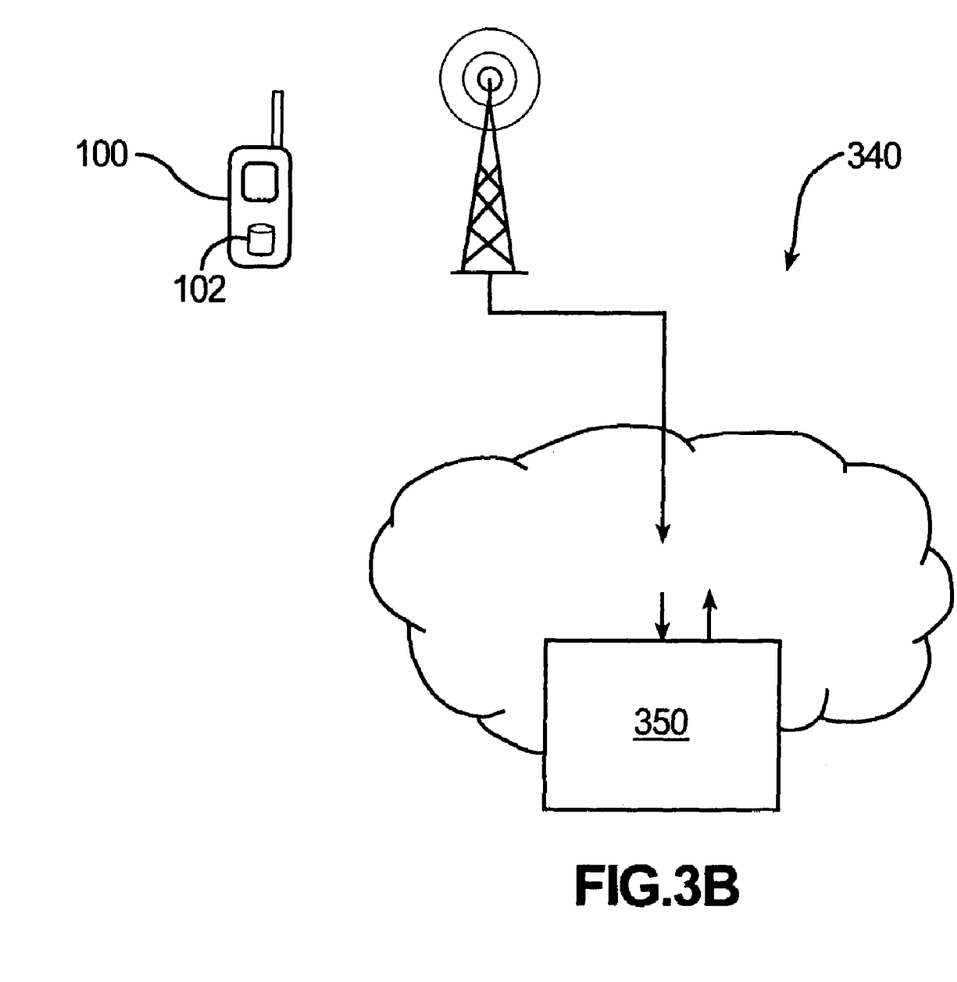
FIG. 3B is a schematic diagram of an embodiment of the present invention.

FIGS. 3A and 3B are flow diagrams of an embodiment of the present invention. This embodiment of the invention includes several steps. This embodiment can be implemented by a system 350 (shown in FIG. 3B). The term "system" as used in this specification and claims means one or more machines in communication with one another, or one or more people operating one or more machines. The term "machine" means a computer or an apparatus other than a computer. In the embodiment shown in FIG. 3B, system 350 is part of a wireless network 340. In step 302, the system receives information related to an agreement between the subscription company and a local wireless service provider. This information can be entered by, for example, a business office that has negotiated an agreement with the local wireless service provider. In FIG. 3, this information is referred to as a first item of information (step 302).

In optional second step 304, the first item of information is converted into a format that is more appropriate for transmission to wireless device 100. However, this step is optional and the first item of information may be transmitted directly to wireless device 100. In another embodiment, the business office that provided the information to the system can pre-format the information so that the information can be sent directly to wireless device 100 without modification.

The system then waits for a registration from wireless device 100. This occurs in step 306. As well known in the art of wireless communications, a registration is an event where a wireless device initiates contact with the wireless network 340 to alert system 350 of its presence, location, and attributes. In this embodiment, the system waits for the registration event before sending the update information to wireless device 100.

In step 308, after system 350 has received the registration event from a wireless device 100, system 350 then sends or transmits the third item of information, or in some cases, the first item of information, to wireless device 100. The terms, "send" and "transmit" as used in this disclosure includes sending information as an SS7 network message, and is not limited to a wireless RF transmission from a cellular tower directly to the wireless device. Recall that the third item of information is a re-formatted version of the first item of information that is more appropriately suited for wireless device 100. Recall also that step 304 is optional, and that system 100 could send the first item of information directly to wireless device 100 without modification.

Many different forms of hardware and software can be used to implement the embodiment shown in FIGS. 3A and 3B. The following disclosure is an example of a system that can be used to implement the embodiment disclosed above.

Figure 4:
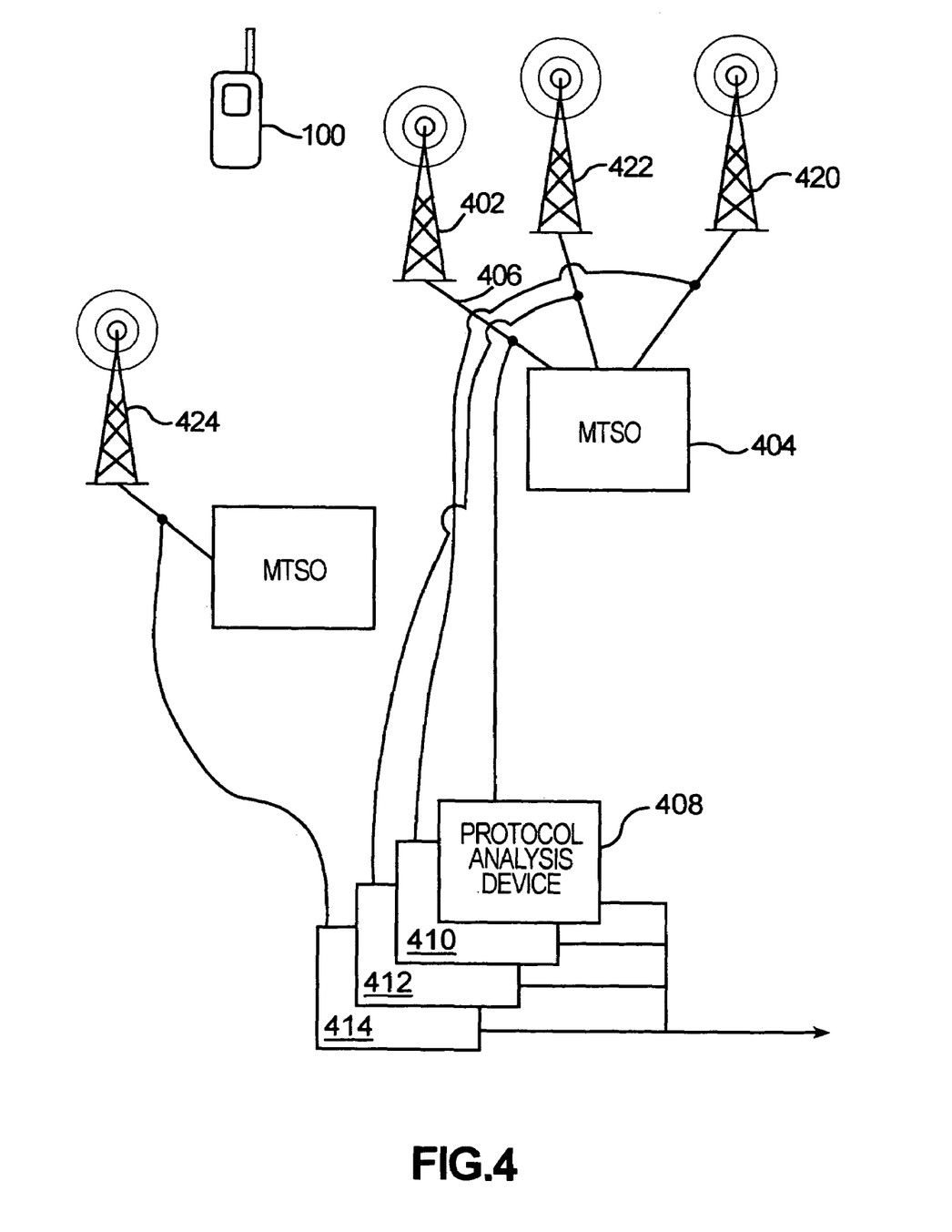
FIG. 4 is a schematic diagram of an embodiment of a system to collect registrations.

One feature of the present invention is to collect registration information, and FIG. 4 shows one embodiment of a system that can be used to collect registration information. As shown in FIG. 4, wireless device 100 communicates with a cellular tower 402. The cellular tower 402 communicates with an MTSO (Mobile Telephone Switching Office) 404 through a cable 406. One method that can be used to collect registration information is to attach a protocol analysis device 408 to cable 406. Protocol analysis device 408 taps into cable 406 and monitors or listens to all of the communications traffic traveling through cable 406. Protocol analysis device 408 listens for a specific signal, a registration signal. Once a registration signal is detected, protocol analysis device 408 outputs information related to the registration signal. If desired, other protocol analysis devices 410, 412, 414 could be deployed to monitor other cell towers 420, 422 and 424, respectively.

Figure 5:
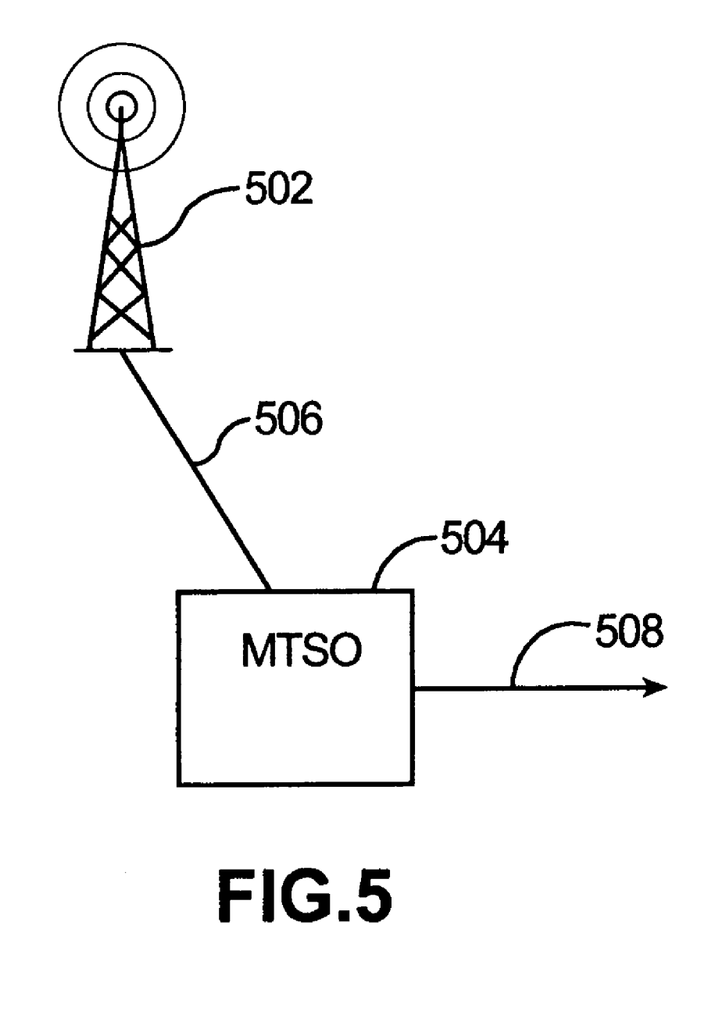
FIG. 5 is a schematic diagram of a second embodiment of a system to collect registrations.

FIG. 5 shows a second method that can be employed to collect registration information. Cell tower 502 communicates with an MTSO 504 via cable 506. MTSO 504 includes provisions that provide a registration feed. In one embodiment, MTSO 504 sends a registration feed out of a line 508. Line 508 can be any suitable medium that can carry a registration feed. In one embodiment, line 508 is an Ethernet line.

Figure 6:
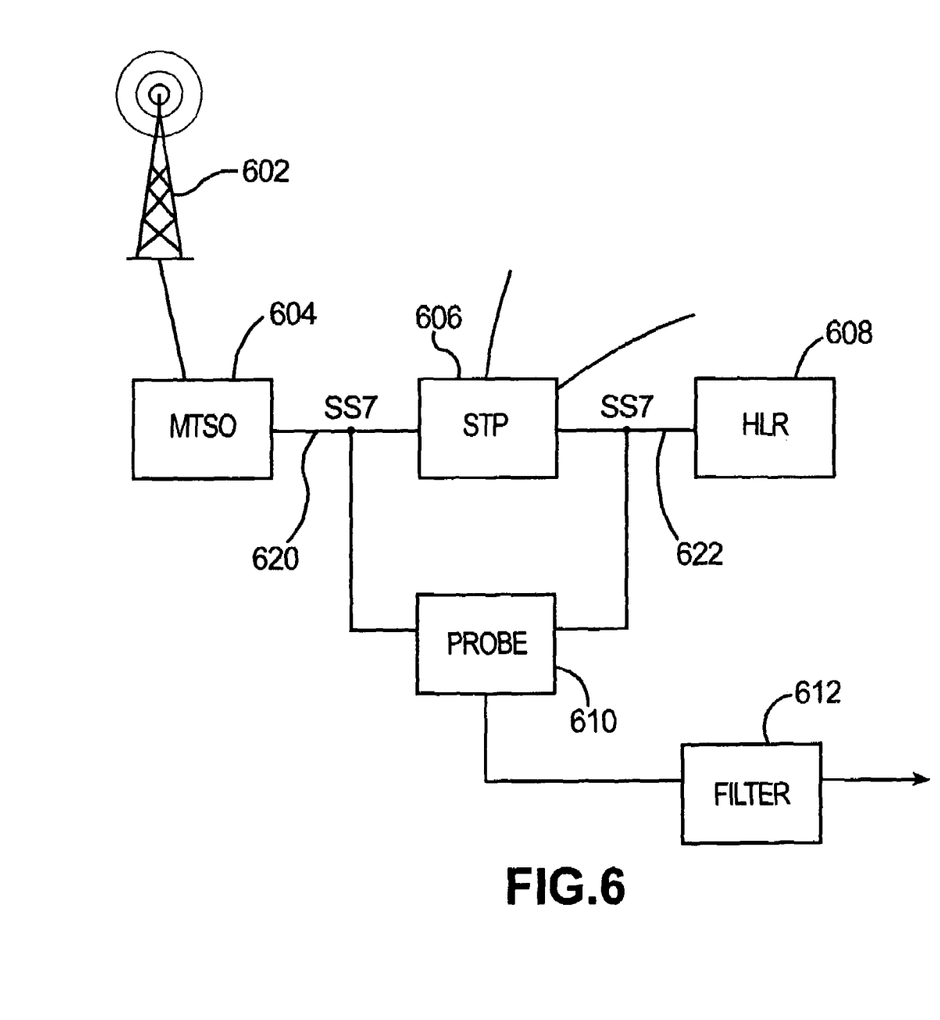
FIG. 6 is a schematic diagram of a third embodiment of a system to collect registrations.

FIG. 6 shows another method that can be used to collect registration information. In this embodiment a cell tower 602 communicates with an MTSO 604. MTSO 604 is connected to other network elements like an STP (Signal Transfer Point) 606. Communications can occur using SS7 (Signaling System 7) protocols. As shown in FIG. 6, a first SS7 link 620 connects MTSO 604 with STP 606. STP 606 can be connected to other network elements such as HLR (Home Location Register) 608 with a second SS7 link 622.

A probe 610 is designed to monitor communications activity through an SS7 link and is connected to at least one SS7 link. In the embodiment shown in FIG. 6, probe 610 is connected to two SS7 links 620 and 622. These links 620 and 622 can be disposed on opposite sides, either physically or logically, of STP 606. By monitoring links 620 and 622, probe 610 retrieves messages that are sent through links 620 and 622. Probe 610 can retrieve one type of message, several types of messages or all of the messages traveling through links 620 and 622. In the embodiment shown in FIG. 6, probe 610 retrieves all of the messages that travel through links 620 and 622. All of the messages are then sent to processor 612. In other words, probe 610 retrieves raw SS7 data. Processor 612 receives all of the messages and then determines which of the messages are registrations. Once processor 612 has determined that a certain message is a registration, then processor 612 sends the registration message to a system for further processing, for example, the registration message could be sent to item 350 in FIG. 3B or to item 812 in FIG. 8. In an embodiment of the invention, processor 612 is a Sun Microsystems computer, probe 610 is an INET GEO probe, and the information sent by processor 610 includes MIN (Mobile Identification Number), ESN (Electronic Serial Number), and PC (Point Code).

Figure 7:
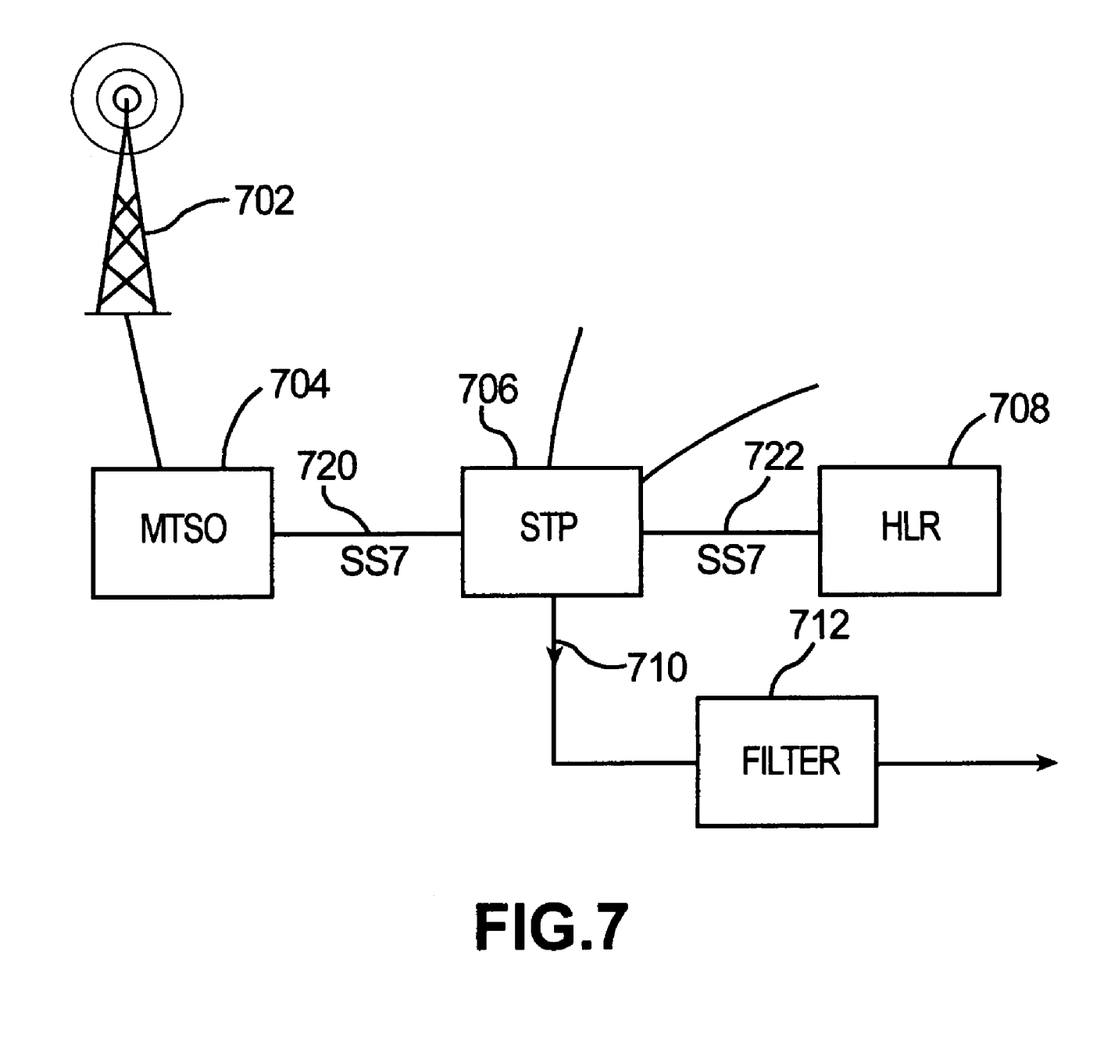
FIG. 7 is a schematic diagram of a fourth embodiment of a system to collect registrations.

FIG. 7 shows another method that can be used to collect registration information. Cell tower 702 communicates with MTSO 704. MTSO is connected to a communications network using an SS7 link 720. STP 706 is one element of the communications network that is connected to MTSO 704. In this embodiment, STP 706 and MTSO 704 communicate using SS7 link 720. STP 706 is connected to other elements of the communications network, like HLR 708. STP 706 communicates with HLR 708 using a second SS7 link 722.

In this embodiment, STP 706 includes provisions that permit it to send or copy messages. In the embodiment shown in FIG. 7, STP 706 includes an output 710. In one embodiment, STP 706 is a TEKELEC Eagle STP that includes a gateway screening feature. This feature can be used to send a copy of all messages that travel through STP 706 to an output 710. The messages are not re-routed to output 710, instead, copies of some or all of the messages are sent out of output 710. This arrangement is similar to a Y-connector that sends an input signal to two different outputs.

The messages are sent to processor 712. Processor 712 receives all of the messages and then determines which of the messages are registrations. Once processor 712 has determined that a certain message is a registration, then processor 712 sends the registration message to a system for further processing, for example, the registration message could be sent to item 350 in FIG. 3B or to item 812 in FIG. 8. In an embodiment of the invention, processor 712 is a computer. In an exemplary embodiment, the computer is a Sun Microsystems computer. The information sent by processor 712 can include MIN (Mobile Identification Number, ESN (Electronic Serial Number), and PC (Point Code).

Figure 8:
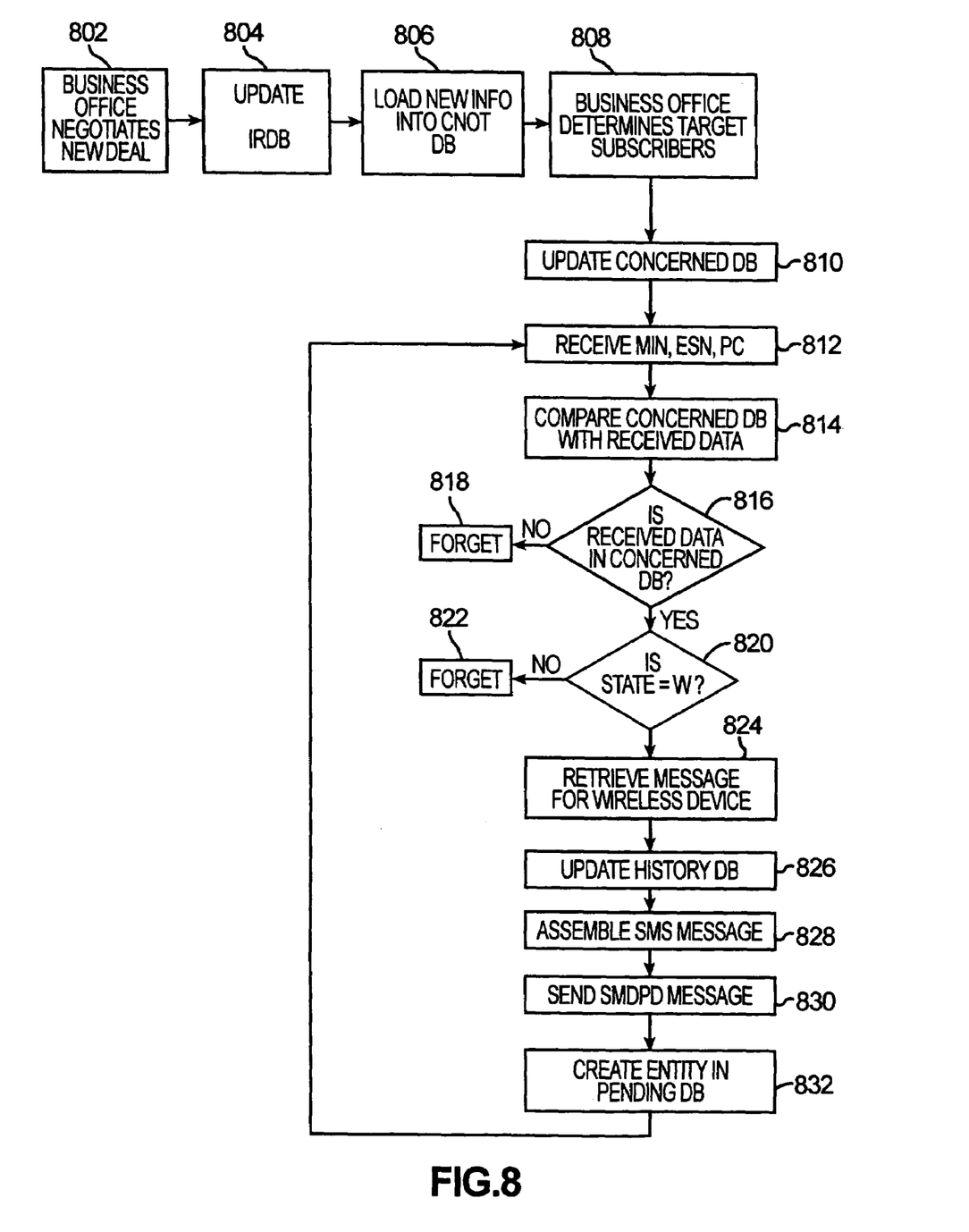
FIG. 8 is an exemplary flow diagram of an embodiment of the present invention.
Figure 11:
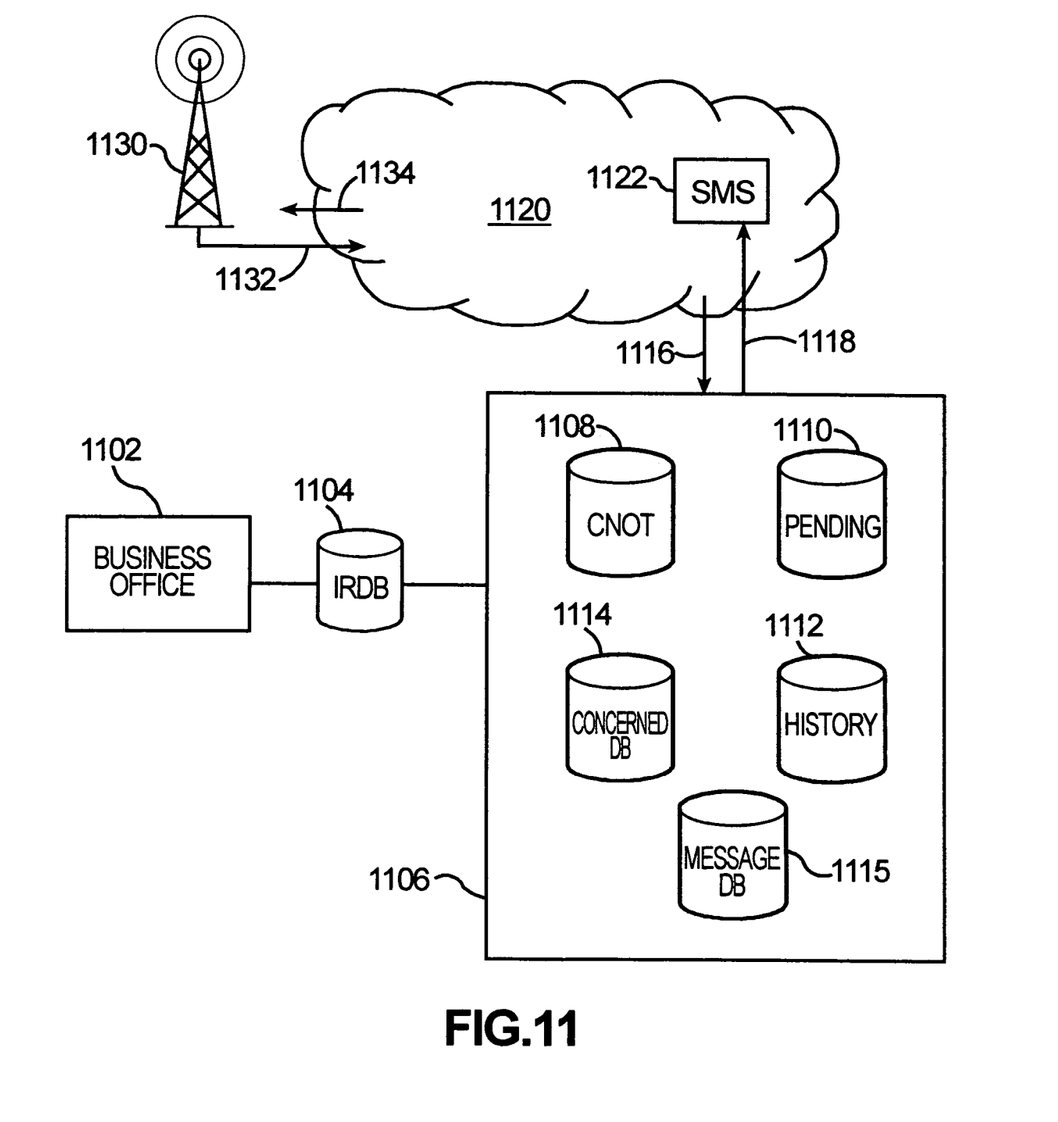
FIG. 11 is a schematic diagram of an embodiment of the present invention.

FIG. 8 shows an exemplary flow diagram of an embodiment of the present invention and FIG. 11 shows a schematic diagram of an embodiment of the present invention.

Referring to FIG. 11, a business office 1102 is in communication with an IRDB database 1104 and a system 1106. System 1106 is adapted to send messages to wireless devices using a communications network 1120. Communications network 1120 can include one or more cell towers 1130 and at least one SMS resource 1122.

As business office 1102 enters into new agreements with various local wireless service providers, business office 1102 updates IRDB 1104. IRDB 1104 generally maintains a database of current local wireless service providers. System 1106 communicates with IRDB 1104 and sends the updated information contained in IRDB 1104 to various wireless devices. System 1106 can include one or more databases. These databases can exist in any desired medium, for example, magnetic or optical disk, or memory. Preferably, these databases exist in computer memory or RAM. In the embodiment shown in FIG. 11, system 1106 sends this updated information as the wireless devices register with communications network 1120.

From time to time, wireless devices autonomously register with communications network 1120. The autonomous registration is first received by cell tower 1130 and then the registration 1132 is sent to communications network 1120, along with control channel traffic, voice channel traffic, and other types of messages. The registration messages are extracted from all of the other types of information in communications network 1120. Preferably, the systems and methods shown in FIGS. 4, 5, 6 or 7 are used to extract registration messages from the many different types of information in communications network 1120 and are also used to deliver those registration messages 1116 to system 1106. In response to registration messages 1116, system 1106 sends updated information 1118 to an SMS resource 1122 associated with communications network 1120. Eventually, a message, preferably an SMS message, is sent 1134 to cell tower 1130 and ultimately to the wireless device. This message includes information that can be used by a wireless device to update its database 102. Given this structural arrangement, FIG. 8 shows an exemplary flow diagram of a process that may be used with the structure shown in FIG. 11. Of course, the steps shown in FIG. 8 can be accomplished with different systems and hardware.

Referring to FIGS. 8 and 11, the process shown in FIG. 8 runs continually. For purposes of explanation, step 802 has been arbitrarily selected to be the first step discussed, keeping in mind that the process shown in the embodiment shown in FIG. 8 is a continuous process and any of the steps could be designated as the "first" step. In step 802, business office 1102 negotiates an agreement with a local wireless service provider. Assuming that the agreement alters one or more of the local wireless service providers for the subscription company, IRDB database 1104 is updated in step 804 to reflect the change.

In second step 804, IRDB database 1104 is updated, and the updates preferably include information associated with new wireless service providers who have agreed to carry or serve the subscription companies' customers. After IRDB database 1104 has been updated, the new information is loaded into the CNOT (Centralized Notification) IRDB database 1108. This occurs in step 806.

After the new information has been loaded into the CNOT IRDB database 1108, business office 1102 determines which target subscribers should receive the updated information in step 808. This is because not every subscriber may require an updated database. After business office 1102 has determined which target subscribers should receive the updated database, the concerned database 1114 is updated in the next step, step 810. The concerned database 1114 includes information related to those customers who have not yet received the updated database and are currently waiting to receive the updated database. Steps 816 and 820 can be combined as one transaction or step.

In the next step, step 812, system 1106 receives registration information. In the embodiment shown in FIG. 8, system 1106 receives the MIN (mobile identification number), the ESN (electronic serial number) and the PC (point code). In step 814, the received MIN is compared with the information contained in the concerned database 1114. In step 816, if the received MIN is found in the concerned database 1114, then the process proceeds to step 820. If the received MIN is not in the concerned database 1114, then the process goes to step 818, where the process ends for that MIN. In step 820, if the state for the MIN equals W, which means that the concerned database 1114 has identified this MIN as waiting for the updated information, then the process proceeds to step 824. If the state does not equal W, or the wait state, then the process proceeds to step 822 where the process ends for that MIN.

In step 824, the system retrieves a message based on the message type for IRDB messages. In other words, an appropriate message is retrieved from message database 1115 based on the type and model number of the cell phone and the update made to the IRDB for the specific wireless device that is associated with the matching MIN. In step 826, history database 1112 is updated. From the information assembled in step 824, an SMS message is assembled in step 828. In step 830, an SMDPD message is sent to the wireless device through SMS system 1122 associated with communications network 1120.

After the SMDPD message has been sent, an entry is created in the pending database 1110. This occurs in step 832. After that step, in step 834, the process returns to step 812 and the process waits for another wireless device to register. In the embodiment shown in FIG. 8, the process waits for a receipt of a MIN, an ESN and a PC in step 812. This process continues until there are no more entries in concerned database 1114, at which point the process stops, and waits for the business office to negotiate another agreement with a local wireless service provider in step 802. However, practically speaking, concerned database 1114 is rarely, if ever, empty due to the constant change in agreements made by the business office in step 802 and the relatively large volume of wireless devices that must be notified of those changes. In other words, this is a continuous process, with the concerned database almost never reaching a state of being empty.

Concerned database 1114 can be flushed from time to time. In this flushing process, records that are no longer needed are deleted from concerned database 1114. Deleted records can include records of wireless devices that have successfully received the updated information and have successfully acknowledged receipt of the updated information. Concerned database 1114 can be flushed at any desired time interval. Preferably, concerned database 1114 is flushed every 24 hours.

Figure 9:
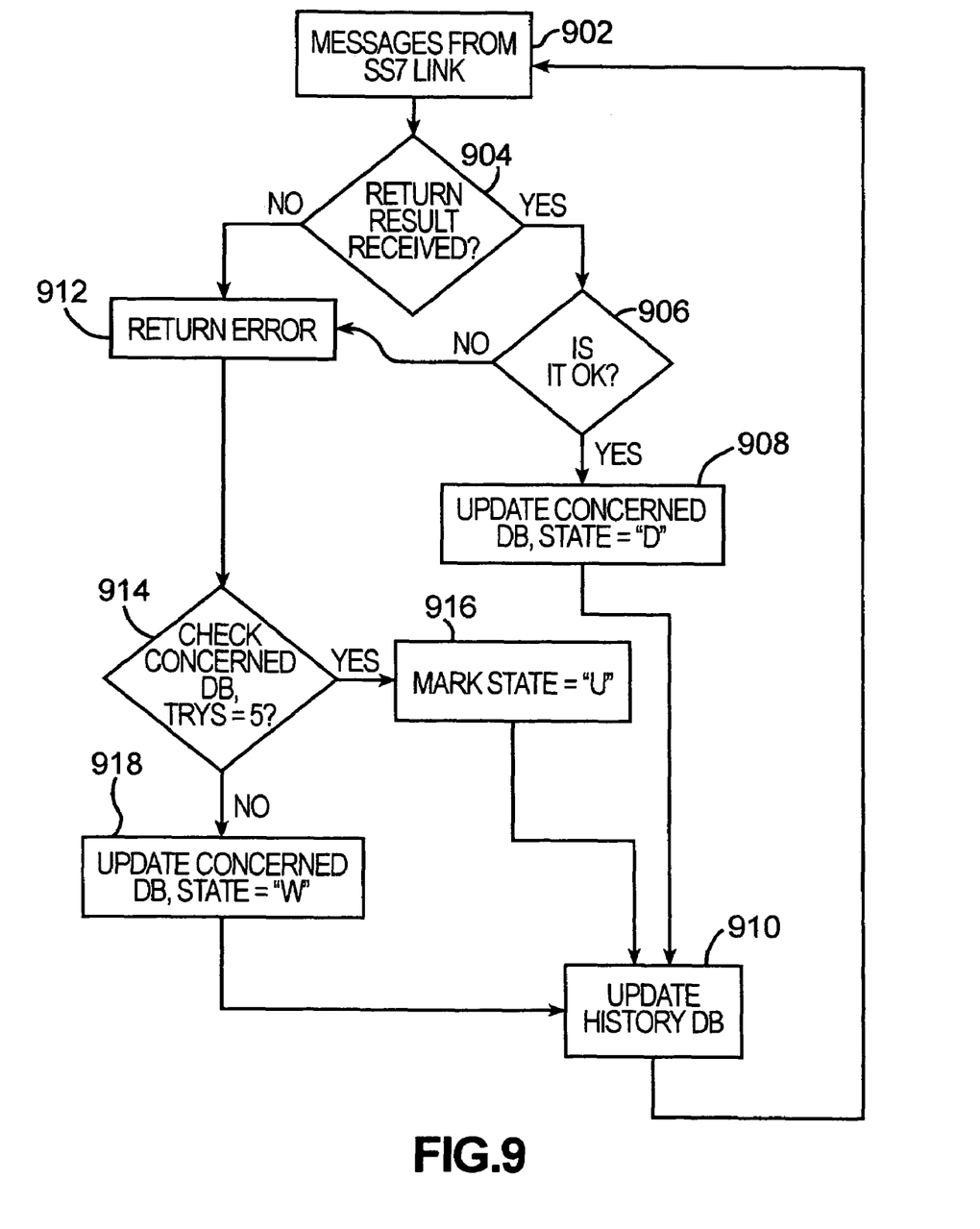
FIG. 9 is an exemplary flow diagram of an embodiment of an acknowledgement loop in accordance with the present invention.

FIG. 9 is an embodiment of an acknowledgment loop. In step 902, messages are received from the SS7 link. In step 904, the system determines whether the SS7 message is a return result. If the SS7 message is a return result, then in step 906, the system determines if the return result is okay. If the return result is okay, the system updates the concerned database in step 908. In the embodiment shown in FIG. 9, the state of the wireless device is changed to D or done.

After that has been completed, the system updates the history database in step 910. After the history database has been updated, the system returns to step 902 to await another message from the SS7 link. Returning to the return results, step 904, if the return result is an error in step 902, the system checks the concerned database to see if the number of attempts is equal to a predetermined number. In the example shown in FIG. 9, the predetermined number is five. In other words, the system attempts to update the database of the wireless device several times. As known in the art of SMS messaging, after messages are received by the wireless device, the wireless device returns a result to the SS7 network. In step 914, the system determines if a certain predetermined number of return result failures has occurred. In other words, the system determines if the wireless device is unable to return a successful return result in a certain number of tries. In the embodiment shown in FIG. 9, the number of attempts is five. If after five attempts, the wireless device is unable to return a successful result, the system marks the concerned database of the wireless device as U or unable, in step 916. After the wireless device has been labeled U, the system updates the history database in FIG. 910. Again, the process returns to step 902 where the system waits for another message from the SS7 network.

Returning to step 914, if the number of tries or attempts to receive a successful return result is less than the predetermined number, the system then updates the concerned database with a state of W, or waiting, in step 918. In other words, the wireless device is returned to the waiting state and is waiting to receive the updated database. After the wireless device has been marked, the process moves to step 910, where the history database is updated, then the process returns to step 902 and the4 system waits for another SS7 message to process.

Figure 10:
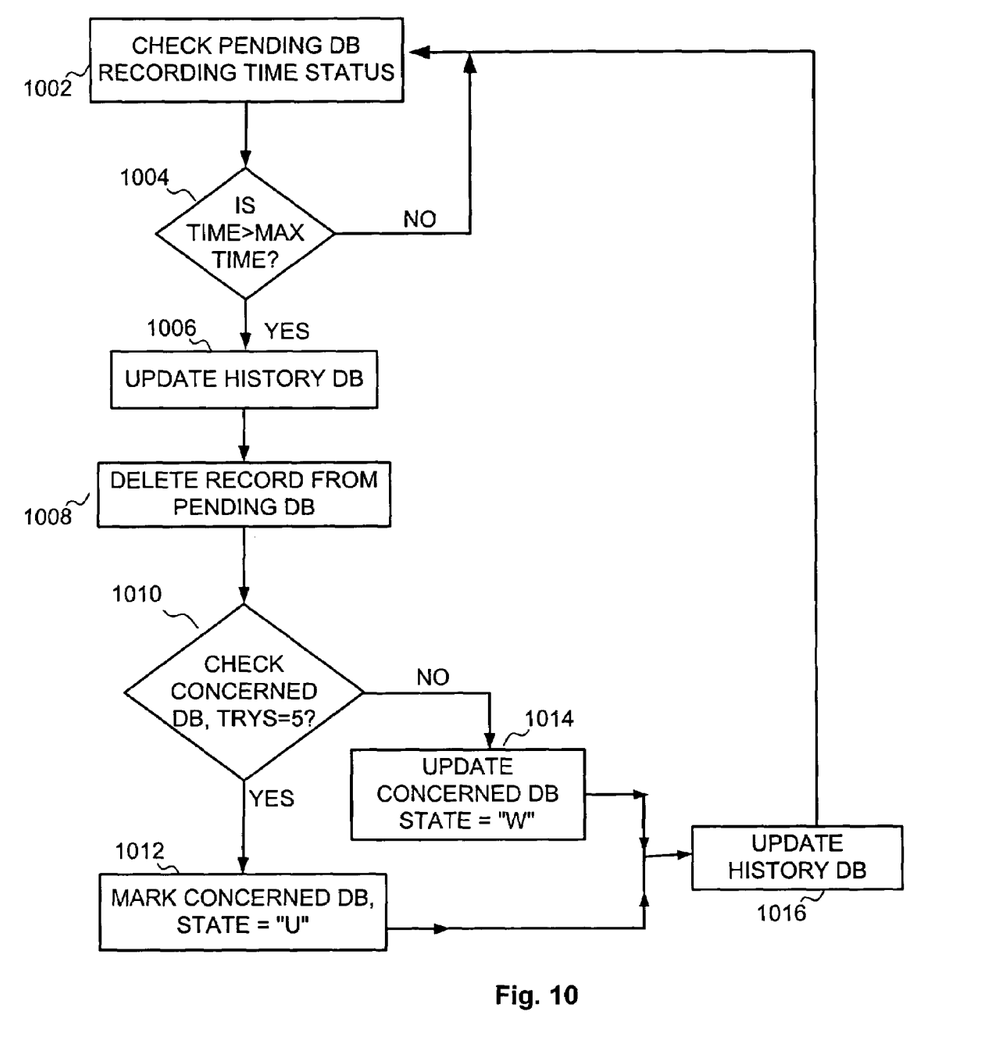
FIG. 10 is an exemplary flow diagram embodiment of a non-acknowledgement loop in accordance with the present invention.

FIG. 10 is an example of a flowchart for an embodiment of a process for handling situations where an acknowledgement is not received from the wireless device. Again, the process shown in FIG. 10 is a continuous process and any of the steps could be the "first" step. For purposes of explanation, step 1002 has been arbitrarily selected as the first step. Referring to FIGS. 10 and 11, in step 1002, a record from pending database 1110 is selected and the time status of that record is checked.

System 1106 determines how long that particular record has been pending in step 1004. If the time the record has been pending is less than a certain predetermined maximum time, then the process returns to step 1002 to retrieve another record. If the time of the record exceeds the predetermined time, then the process moves onto step 1006. The predetermined time can be any time suitable time depending on the network, the wireless device, available bandwidth and many other factors. Generally, the predetermined time is selected so that it roughly corresponds to a time period where, given all of the characteristics of the factors mentioned above, it is likely that system 1106 will receive an acknowledgement from the wireless device. The predetermined time can vary from 0.1 seconds to 600 seconds or more. Typically, the predetermined time is between 60 and 300 seconds. For example, the predetermined time is set at 120 seconds.

If the predetermined time has been exceeded for a particular record, system 1106 updates history database 1112 in step 1006. In the embodiment shown in FIG. 10, system 1106 associates the record with a no acknowledgement condition. This can be accomplished by providing indicia on the record in history database 1112.

After the record has been updated, the record is deleted from pending database 1110 in step 1008. This is because the MIN of the wireless device associated with the record has already received the updated database. In the next step, step 1010, the concerned database 1114 is checked to determine how many attempts have been made to successfully deliver the updated database and receive an acknowledgement from the wireless device. If an acknowledgement is not received after numerous attempts, then system 1106 notes the problem. The exact number of attempts can be selected depending on a variety of circumstances. Generally, the number of attempts is selected to accommodate expected difficulties that the wireless device may experience in returning an acknowledgement. But the number is not so high that problems are not quickly detected. In the example shown in FIG. 10, the number of attempts has been set to 5, although a smaller or greater number of attempts could also be used.

If the number of attempts is less than the predetermined number, then system 1106 moves to step 1014 where the record in concerned database 1114 is given a state of "W," the wait state, meaning that the wireless device has not yet successfully received the updated information and successfully returned an appropriate acknowledgement. After that step, the system moves to step 1016 where history database is updated and the process returns to step 1002 where the system checks the next record in pending database 1110.

Returning to step 1010, if the number of attempts equals or exceeds the predetermined number, then the process moves onto step 1012 where the system marks the record in concerned database 1114 as "U" or unavailable. After that has occurred, the process moves to step 1016 where the history database 1112 is updated. After history database 1112 has been updated, the process returns to step 1002 and the system checks the next record in pending database 1110. In this way, system 1106 manages situations where an appropriate acknowledgement is not received from the wireless device.

It will be apparent to those skilled in the art that various modifications and variations can be made in the method and apparatus for delivering messages to wireless devices without departing from the spirit or scope of the invention. Thus, it is intended that the present invention cover the modifications and variations of this invention provided they come within the scope of the appended claims and their equivalents.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for determining successful delivery of an SMS message to a wireless device comprising the steps of:
   (a) transmitting an update to the wireless device, the transmitting performed upon detecting a presence of the wireless device using location information received as a result of the detecting;
   (b) updating a record in a pending database to reflect the transmitting;
   (c) if a return result is received in response to the transmitting:
       determining if the return result is an error, the return result determined to be an error if the update is not successfully stored on the wireless device;

if the return result is an error, then determining the total number of errors received for the wireless device and comparing the total number of errors to a predetermined number, the total number of errors reflecting a corresponding number of attempts to transmit the update; and if the total number of errors equals or exceeds the predetermined number, then associating the wireless device with an unable condition in at least one of a concerned database and a history database;

(d) if a return result is not received in response to the transmitting: determining a total time that the record has been pending; and updating a record associated with the wireless device in the history database if the total time exceeds a predetermined time period, the updating including marking the record as unavailable.

2. The method according to claim 1, further comprising the step of updating the at least one of a concerned database and a history database with a wait state for a record associated with the wireless device if the total number of errors is less than the predetermined number.

3. The method according to claim 1, further comprising the step of updating the at least one of a concerned database and a history database with a done state for a record associated with the wireless device if the return result is not an error.

4. The method of claim 1, wherein the update includes at least one of: a new agreement between a subscription company and a local wireless service provider, and a change to an existing agreement between the subscription company and the local wireless service provider.

5. The method of claim 1, further comprising updating a record in the history database with a done state if the return result is not an error, indicating the update is successfully stored on the wireless device.

6. A method for determining successful delivery of an SMS message to a wireless device comprising the steps of:

(a) determining whether a return result has been received from a wireless device to which an update has been transmitted;

(b) if no return result has been received:
checking a time stamp of a record associated with the wireless device in a pending database, the pending database storing records for wireless devices for which an update has been transmitted;
using the time stamp to determine a total time that the record has been pending;
determining if the total time exceeds a predetermined time period; and
updating a record associated with the wireless device in a history database if the total time exceeds the predetermined time period, the updating including marking the record as unavailable, reflecting that no return result has been received in response to transmitting the update; and (c) if a return result is received indicating an error:
checking a record in a concerned database to determine the number of attempts that have been made to transmit the update to the wireless device; wherein the record in the concerned database is marked with a wait state if the number of attempts is less than a predetermined number and the history database is updated a second time reflect the wait state.

7. The method according to claim 6, further comprising the step of deleting the record from the pending database if the total time exceeds the predetermined time period.

8. The method according to claim 6, wherein the record in the concerned database is marked with a second state if the number of attempts is greater than or equal to a predetermined number.

9. The method according to claim 8, further comprising a step of updating the history database a second time to reflect the second state.

10. The method of claim 6, wherein the update includes at least one of: a new agreement between a subscription company and a local wireless service provider, and a change to an existing agreement between the subscription company and the local wireless service provider.

11. The method of claim 6, wherein the predetermined time period is based upon factors that influence an expectation that a return result will be received, the factors including at least one of:
the wireless device;
network associated with the wireless device; and
available bandwidth on the network.

12. The method of claim 6, wherein the predetermined number of attempts is selected to accommodate potential difficulties experienced by wireless devices in returning an acknowledgement.

13. A system for monitoring the receipt of a first message by a wireless device comprising:
a message database containing information to be sent to the wireless device in the first message, the wireless device including memory for storing the information;
a concerned database for storing information concerning wireless devices designated to receive the first message and awaiting receipt of the first message;
a pending database for storing records concerning wireless devices to which the first message is sent;
and a history database providing indicia of the records indicating the status of the records, the indicia including a done state, an unable state, a wait state, a no acknowledgement state, and an unavailable state,
wherein the system is configured to receive a return result over a communication link from the wireless device indicating whether the first message has been received by the wireless device, and wherein the records in the concerned database contain a plurality of labels associated with the wireless device, wherein the labels indicate the status of the wireless device with respect to the receipt of the first message.

14. The system of claim 13, wherein the wireless device is designated as unable if the return result is received indicating an error and after a predetermined number of attempts at transmitting the first message have been made.

15. The system of claim 14, wherein the predetermined number of attempts is selected to accommodate potential difficulties experienced by wireless devices in returning an acknowledgement.

16. The system of claim 13, wherein a record in each of the concerned database and the history database for the wireless device is designated as waiting if the return result is received indicating an error and a predetermined number of attempts at transmitting the first message has not been reached.

17. The system of claim 13, wherein a record is entered in the pending database in response to transmitting the first message to the wireless device, and wherein the record is deleted after the record has been designated as no acknowledgement state, indicating the record has been pending for a predetermined period of time where no return result has been received.

18. The system of claim 17, wherein the history database and the concerned database are updated to reflect the deletion of the record from the pending database.

19. The system of claim 17, wherein the predetermined period of time is based upon factors that influence an expectation that a return result will be received, the factors including at least one of:
   the wireless device;
   network associated with the wireless device; and
   available bandwidth on the network.

20. The system of claim 13, wherein the first message is an update, the update including at least one of: a new agreement between a subscription company and a local wireless service provider, and a change to an existing agreement between the subscription company and the local wireless service provider.

21. The system of claim 13, wherein a record in the history database is updated with a done state if the return result is not an error.

* * * * *